(12) United States Patent
Towers et al.

(10) Patent No.: US 6,276,765 B1
(45) Date of Patent: Aug. 21, 2001

(54) INTEGRATED ANTI-SKID AND HYDRAULIC BOOSTER BRAKING CONTROL

(75) Inventors: Kenneth Scott Towers, Granger, IN (US); Timothy Jay Albert, Niles, MI (US); Gregory Paul Goodzey, South Bend, IN (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 09/436,879

(22) Filed: Nov. 9, 1999

Related U.S. Application Data

(62) Division of application No. 09/090,683, filed on Jun. 4, 1998.

(51) Int. Cl.[7] .................................................. B60T 8/88
(52) U.S. Cl. .................................. 303/122.1; 303/122.11; 303/113.4; 303/155
(58) Field of Search ........................... 303/2, 9, 122.09, 303/122.11, 122.1, 113.4, 176, 155

(56) References Cited

U.S. PATENT DOCUMENTS

| | | | |
|---|---|---|---|
| 4,258,819 | * 3/1981 | Baptiste, Sr. ........................... | 303/89 |
| 5,013,094 | * 5/1991 | Nishii et al. ........................... | 303/52 |
| 5,393,131 | * 2/1995 | Nomura et al. ...................... | 303/122.09 |
| 5,868,473 | * 2/1999 | Kato et al. .......................... | 303/122.09 |
| 5,954,406 | * 9/1999 | Sawada ............................ | 303/122.09 |
| 6,007,164 | * 12/1999 | Sakai et al. ...................... | 303/122.12 |
| 6,092,880 | * 7/2000 | Towers et al. .................. | 303/122.09 |

* cited by examiner

Primary Examiner—Robert J. Oberleitner
Assistant Examiner—Mariano Sy
(74) Attorney, Agent, or Firm—Leo H McCormick, Jr.; Warren Comstock

(57) ABSTRACT

A secondary source of braking for large hydraulically braked vehicles utilizing the available power source (38) provided by typically available anti-skid and traction control braking systems. The anti-skid braking system is used to control the secondary braiding function in a manner optimal to the operating condition of the vehicle. Unique distinctive operating modes are used when the vehicle is either moving (79, 81, 83), or stationary (57, 59, 73). The advantages of the stationary mode are fast time response and high output pressure controlled with a minimum of pump operation and fluid movement. The advantages of the dynamic mode are the ability to modulate brake pressure in response to the driver's command.

8 Claims, 3 Drawing Sheets

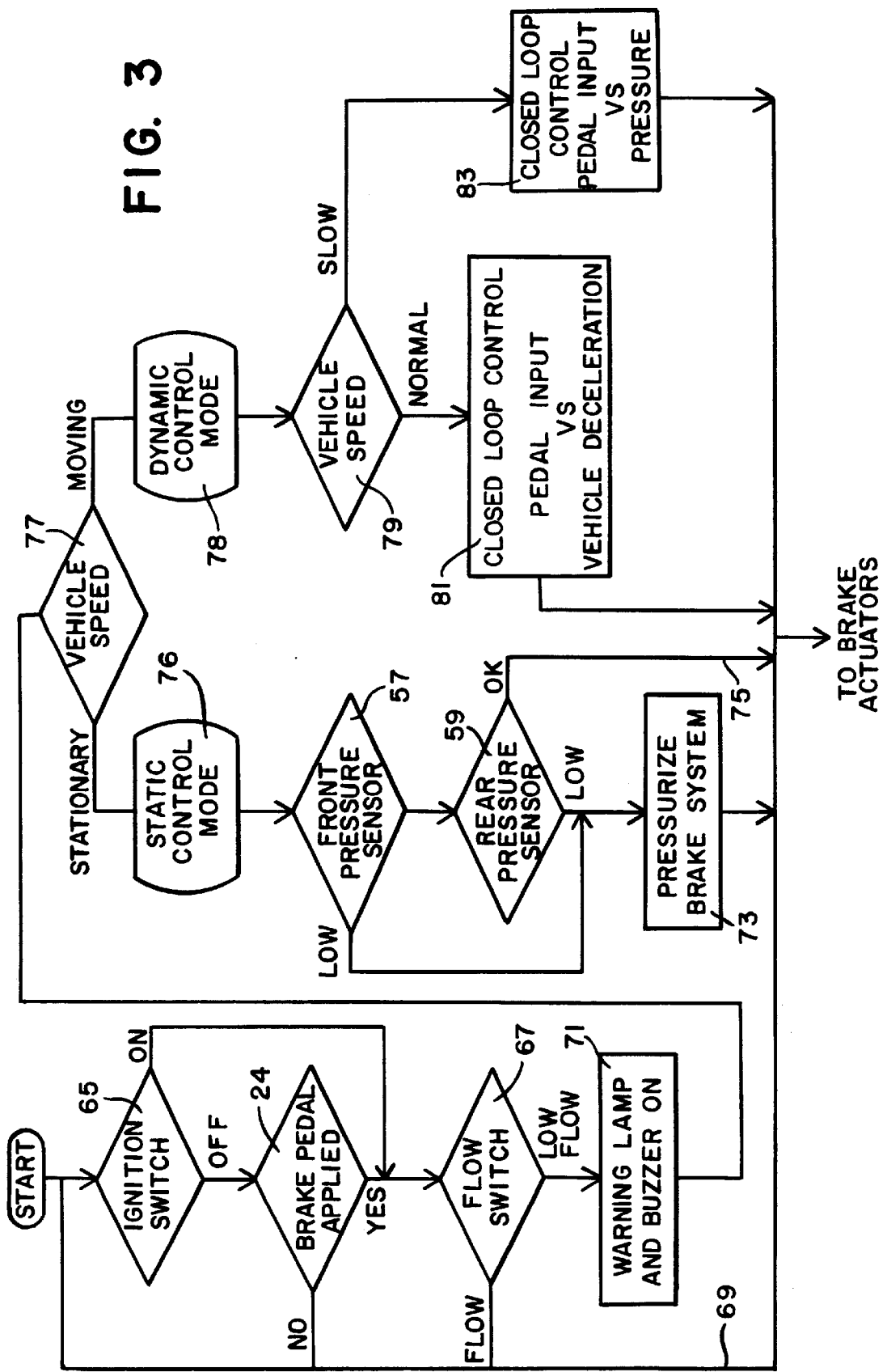

INTEGRATED ANTI-SKID AND HYDRAULIC BOOSTER BRAKING CONTROL

This application is a divisional of application Ser. No. 09/090,683, filed Jun. 4, 1998.

The present invention relates generally to a power assisted braking system for a vehicle and more particularly to methods and apparatus for optimal control and improved time response for a secondary or back-up braking system.

BACKGROUND OF THE INVENTION

The time-honored skid avoidance technique of "pumping" a brake pedal to control a skid situation has largely been displaced by anti-lock braking systems. Many known anti-lock devices operate by cyclically increasing and decreasing a braking force exerted on the wheels so that a slipping wheel having a tendency to lock is permitted to re-accelerate back to a spoed corresponding to the speed of the vehicle. This is typically achieved by control valves alternately allowing fluid to flow out of and then into a brake cylinder to first lower and then raise the brake pressure in the brake system.

Typically anti-lock or anti-skid braking systems utilize a so-called pump-back scheme or a replenishing scheme during a reapply or build operational sequence to maintain a desired level of hydraulic fluid in a brake system. In a pump-back scheme, the same hydraulic fluid is re-supplied from a local accumulator to the brake pad actuators while in a replenish scheme hydraulic fluid comes from a separate source such as either a hydraulic accumulator or a separate pump and motor.

Most of such anti-lock braking systems are further capable of operating in a traction control function. A traction control function is established by detecting conditions where the rotational speed of a first powered wheel substantially exceeds that of a second powered wheel. To provide a power balance in the operation of a vehicle, a braking force is applied to the powered wheel rotating at a higher speed to effectively transferring driving torque back to that wheel with better traction. Many anti-lock systems having such a traction control feature employ a motor and hydraulic pump or pumps which operate independent of the service braking system. Such a braiding system is disclosed in U.S. Pat. No. 5,709,438 wherein a traction control motor and hydraulic pump are called into action to provide a back-up power assisted braking feature in the event of a malfunction of the primary braking system. Such malfunctions may occur simply because the engine is not operating to drive the primary power braking source, ruptured or failed brake lines, broken power steering pump drive belts, or for a variety of other reasons. This prior patent provides back-up anti-skid braking in but a single mode. This prior patent represents the point of departure for the present invention.

It is desirable to provide a braking control system of the type disclosed in the above mentioned U.S. Patent having a back-up feature which modulates pressure to the service brakes in the event of loss of the primary brake power source. It is also desirable to provide a "wake-up" mode of operation which allows secondary or back-up power assisted braking with the ignition off.

SUMMARY OF THE INVENTION

The present invention provides solutions to the above problems by providing a braking control which uses brake pedal input and vehicle wheel speeds or hydraulic pressure available in a primary braking system to activate a secondary or back-up braking in either a static or dynamic control mode.

In general, the invention provides a power assisted braking system for a vehicle having anti-skid capability with primary and secondary pressurized fluid sources and includes an operator actuable pedal for developing an input force to command the application of braking force hydraulic pressure as well as one or more pressure transducers for measuring the actual hydraulic pressure applied during braking. The vehicle velocity is determined and the vehicle deceleration computed. The primary brake system is operable in a normal mode utilizing a primary source of hydraulic fluid pressure to provide normal power assisted braking. There is an arrangement for detecting a malfunction in the primary braking system fluid source which is effective to substitute the secondary fluid source for the primary fluid source to provide continued back-up power assisted braking. The system is operable in a first back-up mode upon detecting a malfunction of the primary braking system, a command for braking, and a first vehicle speed input to provide anti-skid braking wherein pedal input force is compared with measured vehicle deceleration to generate braking pressure build and decay commands for operating the brake system. The system is operable in a second back-up mode upon detecting a malfunction of the primary braking system, a demand for braking, and a second vehicle speed input to provide anti-skid braking wherein pedal input force is compared with calculated vehicle deceleration to generate braking pressure build and decay commands for operating the brake system.

Also in general and in one form of the invention, a power assisted braking system for a vehicle has a primary power source and an electrically driven back-up power source for supplying pressurized hydraulic fluid for braking. The system includes a wake-up circuit having means for sensing depression of the vehicle brake pedal whereby input force is created, and means responsive to the brake pedal sensing means indicating depression has occurred for enabling the back-up power source to provide power assisted braking even when the vehicle ignition is in the off position. The wake-up circuit may include an arrangement to test for adequate hydraulic pressure either when the brake pedal is depressed or the ignition is turned to the on position and to enable the back-up power source when the hydraulic pressure is not adequate.

Still further in general and in one form of the invention, back-up power assisted braking includes a pump operable upon detection of a malfunction of the normal power assisted braking and at least one transducer for sensing the hydraulic pressure applied to the brake actuators and providing a signal indicative thereof. During back-up power assisted braking, if the sensed hydraulic pressure exceeds a prescribed value, the supply of hydraulic fluid to or from the actuators is blocked and the back-up pump turned off to maintain the braking pressure at the actuators near the prescribed value.

BRIEF DESCRIPTION OF THE DRAWING

FIG. 3 is a functional block diagram describing the several modes of operation of the system of FIGS. 1 and 2.

Corresponding reference characters indicate corresponding parts throughout the several views of the drawing.

DESCRIPTION OF THE PREFERRED EMBODIMENT

Figure 1:
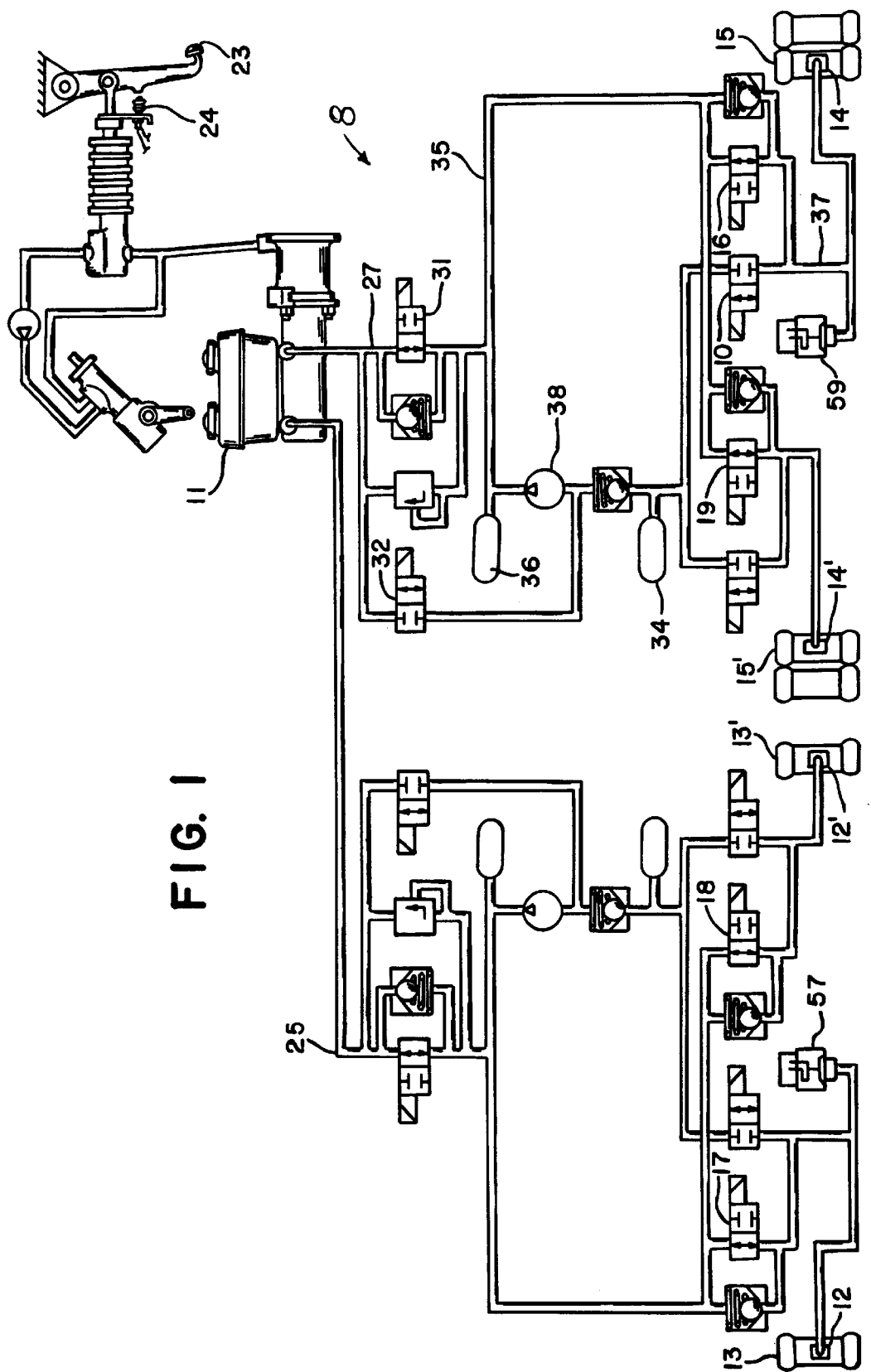
FIG. 1 is a schematic representation of the hydraulic portion of a braking system made according to the principals disclosed in this invention.

A anti-lock hydraulic braking system 8 for use in a light truck or similar vehicle is shown schematically in FIG. 1. A rear wheel drive with dual rear tires is illustrated, but the principles apply equally to other configurations. The braking system 8 includes solenoid actuated anti-skid valves 10 and 16 located between an operator-controlled pressure source or master cylinder 11 and hydraulic brake actuators 12,12' for the front wheel brakes 13,13' and hydraulic actuators 14,14' for the rear wheels 15,15'. Typically, the pressure source 11 is a conventional master cylinder having two separate circuits, one for the front vehicle wheel brakes 13,13' brakes and the other for the rear wheel brakes 15,15'. A suitable pressure source is disclosed in copending application Ser. No. 09/015,166 filed Jan. 29, 1998 and now U.S. Pat. No. 5,960,629, assigned to the assignee of the present invention. The vehicle wheels also have rotational speed sensors (53,55) for providing electrical indications of the angular velocities of individual wheels to an anti-skid electronic control unit.

When the driver wishes to slow the vehicle, the pedal 23 is depressed to develop an input force which is applied to piston in master cylinder 11. Movement of the pistons in master cylinder 11 creates a hydraulic fluid pressure which is transmitted from the master cylinder 11 by way of conduits (brake lines) 25 and 27 to the respective rear and front pairs of brake actuators by way of four individual solenoid actuated anti-skid valves 16, 17, 18 and 19. The individual wheel anti-skid valves such as 16 are normally open to selectively supply braking fluid pressure from the source 11 by way of line 27 to the individual brake actuators such as 12 and 14. Thus, braking fluid flows to the rear wheel brakes 15,15' from the master cylinder 11 via line 27 through valve 31 and line 35 to valves 16,19 and finally by way of line 37,37' to the brake actuators 14,14' during normal braking. A similar normal braking fluid flow path exists for actuators 12,12' for the front wheels brakes 13,13'. Valves such as 10 and 16 function as build and hold valves supplying braking fluid pressure from either line 27 during normal braking or from the accumulator 34 during anti-skid or traction control operation.

Under normal operation when the secondary or back-up system is required two hydraulic valves are actuated. The first valve, such as 32 is commonly known as an ASV, opens to provide a fluid source path from the master cylinder 11 to the inlet of the pump 38. The second valve, such as 31 is commonly known as a USV, closes to permit the build up of hydraulic pressure by the pumps in the braking circuits and accumulator 36. This same technique is applied to both secondary braking and standard ASR (traction control) modes. In addition it is common for the front and rear 38 pumps to share a common motor.

Figure 2:
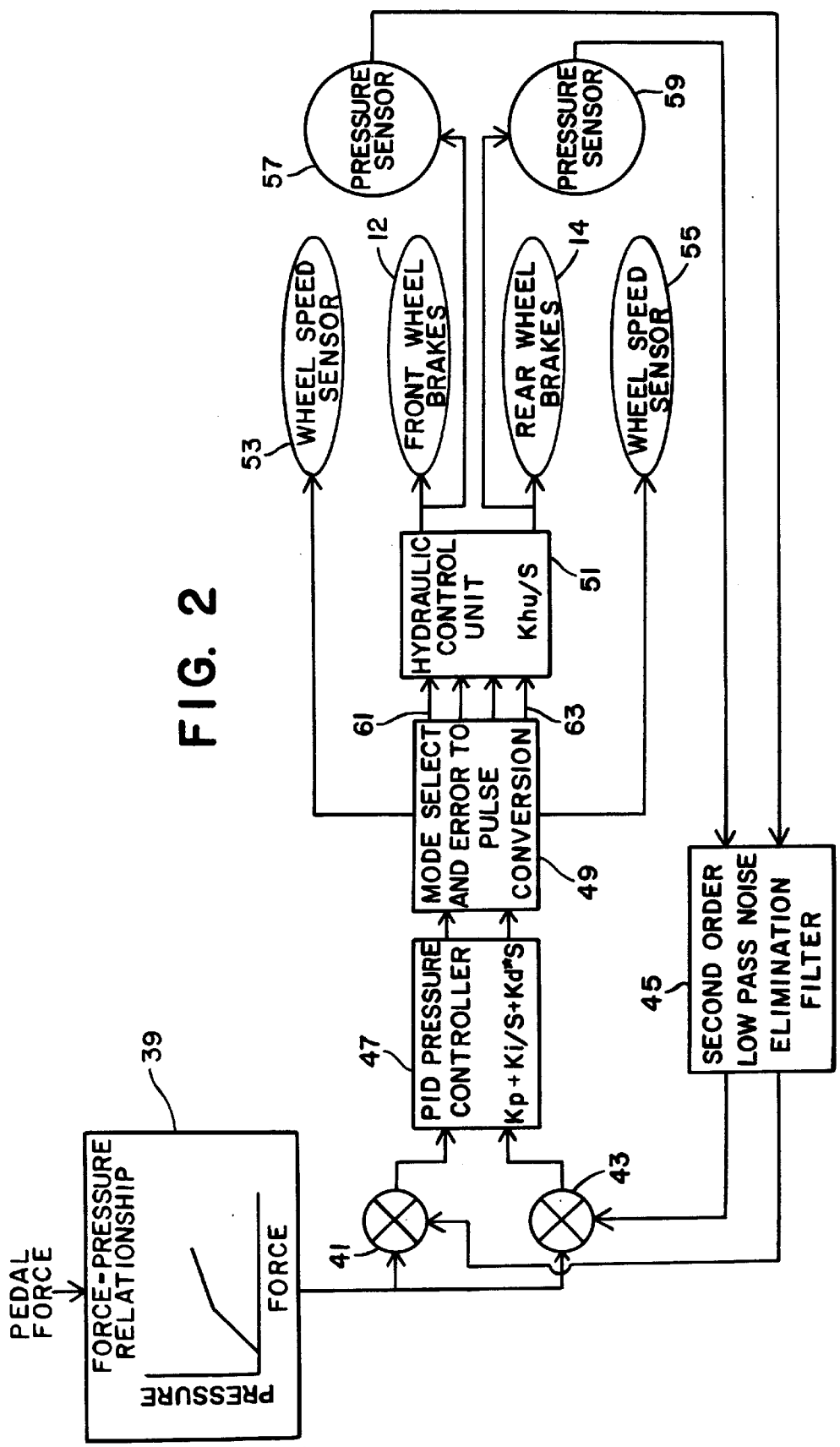
FIG. 2 is a schematic representation of the control arrangement for the system of FIG. 1.

The normal mode of braking and anti-skid operation is illustrated by the control circuitry of FIG. 2. The left hand portion of FIG. 2 comprises components of an electronic control unit of the system. The force applied on depression of pedal 23 is converted at 39 from an input force to a target or commanded hydraulic pressure. A pedal switch 24 may provide an electrical measure of the degree of pedal input force or the pressure may be otherwise monitored. The actual hydraulic pressure is monitored at 57 and 59, and these measured values are passed through a low pass noise eliminating filter 45 and then compared at 41 and 43 with the commanded pressure or desired braking signal. Filter 45 may, for example, have a cut-off frequency of about 10 Hz. Pressure error indicative signals for the front and rear braking 14 circuits are supplied to the PID controller 47. Controller 47 has the transfer function $Kp+Ki/S+Kd*S$ and functions to combine the current error, previous error and the derivative of the error to generate a pair of signals indicative of the required error corrections. The expression for the transfer function employs conventional notation where division by S indicates an integration and multiplication by S indicates differentiation. These error corrections are converted at 49 to build and decay control signals on the output lines such as 61 and 63. These outputs are constant pulse width with the spacing between pulses varied as required. Integrals of the build and decay pulse trains are generated by control unit 51 which has the transfer function $Khu/S$. The control unit 51 controls the solenoids for valves such as 10 and 16.

The outputs of the pressure sensors 57 and 59 may also be monitored to limit the strain on the pumps such as 38 and several of the valves. For example, when the monitored pressure reaches 70 Bar, valves 16 and 19, or 17 and 18 may be shifted to the off position to provide a hold mode where the corresponding pump may be disabled and the vehicle held stationary in position, for example, on a hill.

The several modes of operation of the system are best described in conjunction with FIG. 3 which describes the behavior of the system electronic control unit. With the ignition switch 65 on and the brake pedal 23 depressed as indicated by pedal switch 24, the hydraulic fluid flow from booster 11 is measured at 67. If the flow is adequate, the brakes are applied by a signal on line 69. In the event of a pump or engine failure, flow switch 67 provides a low flow signal to enable the warning lamp and buzzer 71 and to initiate a check of the vehicle speed at 77 from one of the sensors 53 or 55.

If the vehicle is stationary, the system enters the static control mode. In the static control mode, the front and rear pressure sensors 57 and 59 are immediately checked for to determine if an adequate pressure, for example, 70 Bar or above is available for braking. If either is low, the pumps such as 38 are enabled at 73 to build up the pressure and apply the brakes. If both front and rear pressure is adequate, a signal on line 75 is sent to actuate the brakes.

If the vehicle is moving, the system enters the dynamic control mode. If the primary power source for power assisted braking is operating normally, braking is performed as shown in FIG. 2 with pedal input force being compared to the hydraulic pressure as indicated at 83. If there has been a malfunction, the vehicle speed is again sensed at 79. If the speed is above a predetermined value, say greater than 10 MPH, closed loop back-up control is initiated at 81 wherein the pedal input is compared to the actual vehicle deceleration. In this mode, in essence, the wheel speed as sensed at 53 and 55 is fed back through filter 45 and compared to the output of 39. If the speed as sensed at 79 is below a predetermined value, say less than 10 MPH, then an open loop back-up control mode is initiated at 83 with the pedal input being compared to a calculated deceleration.

What is claimed is:

1. A power assisted braking system for a vehicle having a primary power source and an electrically driven back-up power source for supplying pressurized hydraulic fluid for braking, said system including a wake-up circuit having means for sensing depression of the vehicle brake pedal, and means responsive to the brake pedal sensing means indicating depression of the brake pedal has occurred for enabling the back-up power source to provide power assisted braking even when the vehicle ignition is in the off position.

2. The braking system of claim 1 wherein the wake-up circuit includes means to test for adequate hydraulic pressure either when the brake pedal is depressed or the ignition is turned to the on position and to enable the back-up power source when the hydraulic pressure is not adequate.

3. In a power assisted braking system for a vehicle having anti-skid capability where commanded hydraulic braking pressure is compared to vehicle operating parameters to generate build and decay signals for applying and releasing the brake actuators thereby effecting a controlled braking process, said process of selecting a vehicle operating parameter appropriate to the current vehicle operating conditions comprising the steps of:

sensing for vehicle motion;

determining if a primary braking system is functioning properly by sensing pedal force applied by an operator to effect a brake application, a flow of hydraulic fluid from a primary source and a current hydraulic pressure of said hydraulic fluid from said primary source;

selecting a hydraulic pressure as an operational parameter if the vehicle is in motion and said primary braking system is functioning properly, otherwise;

sensing the vehicle speed if the vehicle is sensed to be in motion and said primary braking system is malfunctioning;

selecting calculated vehicle deceleration as the parameter in the event the vehicle speed is sensed to be above a specified value;

selecting a wheel brake pressure as the parameter in the event the vehicle speed is sensed to be below said specified value; and applying a fixed braking pressure if the vehicle is sensed to not be in motion.

4. The process of claim 3 wherein the specified vehicle speed is about ten miles per hour.

5. The process of claim 3 wherein the specified fixed braking pressure is, about 70 Bar.

6. In a power assisted braking system for a vehicle having anti-skid capability where commanded hydraulic braking pressure is compared to a vehicle, operating parameters to generate build and decay signals for applying and releasing the brake actuators thereby effecting a controlled braking process, said process of selecting a vehicle operating parameter appropriate to the current vehicle operating conditions comprising the steps of:

sensing for vehicle motion;

determining if a primary braking system is functioning properly by sensing pedal force applied by an operator to effect a brake application, a flow of hydraulic fluid from a primary source and a current hydraulic pressure of said hydraulic fluid from said primary source;

selecting a hydraulic pressure as an operational parameter if the vehicle is in motion and said primary braking system is functioning properly, otherwise;

sensing the vehicle speed if the vehicle is sensed to be in motion and said primary braking system is malfunctioning;

selecting wheel brake pressure as the parameter in the event the vehicle is sensed to be in motion; and applying a fixed braking pressure if the vehicle is sensed to not be in motion.

7. The process of claim 6 wherein the specified vehicle speed is about ten miles per hour.

8. The process of claim 6 wherein the specified fixed braking pressure is about 70 Bar.

* * * * *